July 15, 1924.

V. E. CLARK

AIRPLANE

Filed July 1, 1922

V. E. CLARK

AIRPLANE

Filed July 1, 1922     5 Sheets-Sheet 5

1,501,523

Witness.
Elmer E. Creed
Wm. T. Pasco.

By

Inventor.
Virginius E. Clark
Ralph H. Chilton
Attorney.

Patented July 15, 1924.

1,501,523

UNITED STATES PATENT OFFICE.

VIRGINIUS E. CLARK, OF DAYTON, OHIO, ASSIGNOR TO DAYTON-WRIGHT COMPANY, OF DAYTON, OHIO, A CORPORATION OF DELAWARE.

AIRPLANE.

Application filed July 1, 1922. Serial No. 572,233.

*To all whom it may concern:*

Be it known that I, VIRGINIUS E. CLARK, a citizen of the United States of America, residing at Dayton, county of Montgomery, and State of Ohio, have invented certain new and useful Improvements in Airplanes, of which the following is a full, clear, and exact description.

This invention relates to airplanes and has particular reference to the lifting planes or wings therefor.

Among the objects of this invention is to provide an airplane wing having a high aerodynamic efficiency and comparatively small weight.

Among the more specific objects are: to provide a wing whose thickness at various points along its length is made approximately proportional to the bending moment to be carried at that point, thus permitting thinner and hence more efficient sections over a considerable part of the wing; to provide a wing having a thin section toward the fuselage, thus giving better vision for the occupants of the fuselage and a better flow of air stream on the tail planes than when a thick section at the center of the wing is used, as is usually the case with internally braced or semi-internally braced wings.

Another object is to provide an improved means for operating flaps on the trailing edge of an aerofoil whereby the force required to operate the flaps is reduced by an auxiliary air vane or aerofoil.

Further objects and advantages of the present invention will be apparent from the following description, reference being had to the accompanying drawings, wherein preferred embodiments of the present invention are clearly shown.

Figure 1:
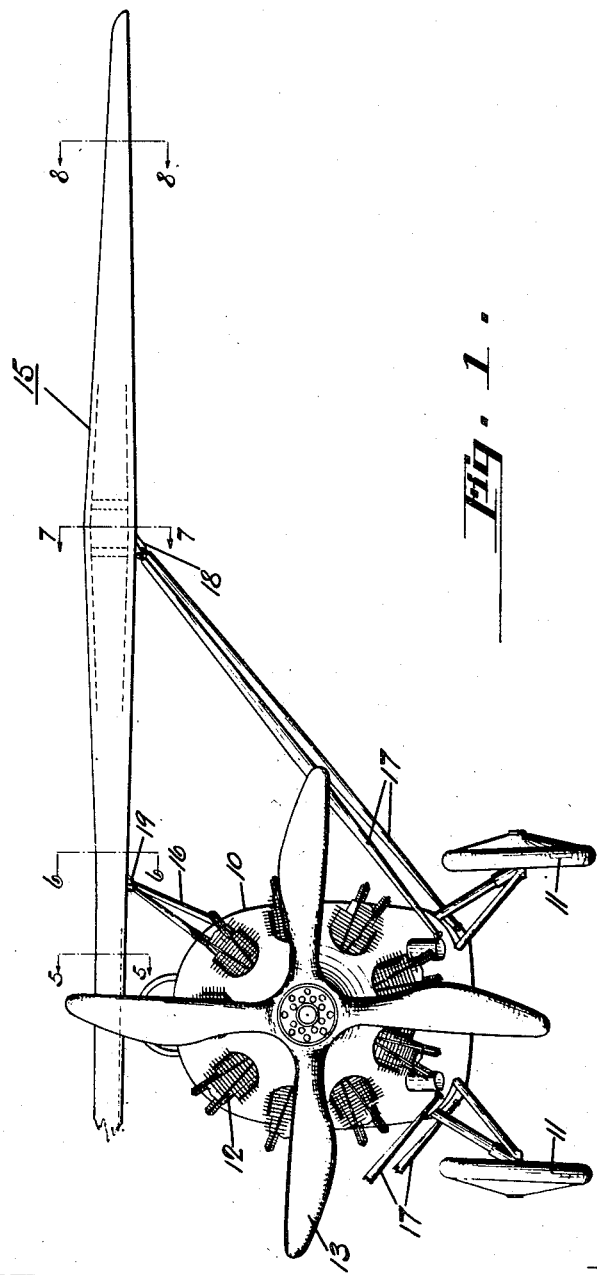
Fig. 1 is a front elevation of a monoplane having a wing built according to this invention.
Figure 2:
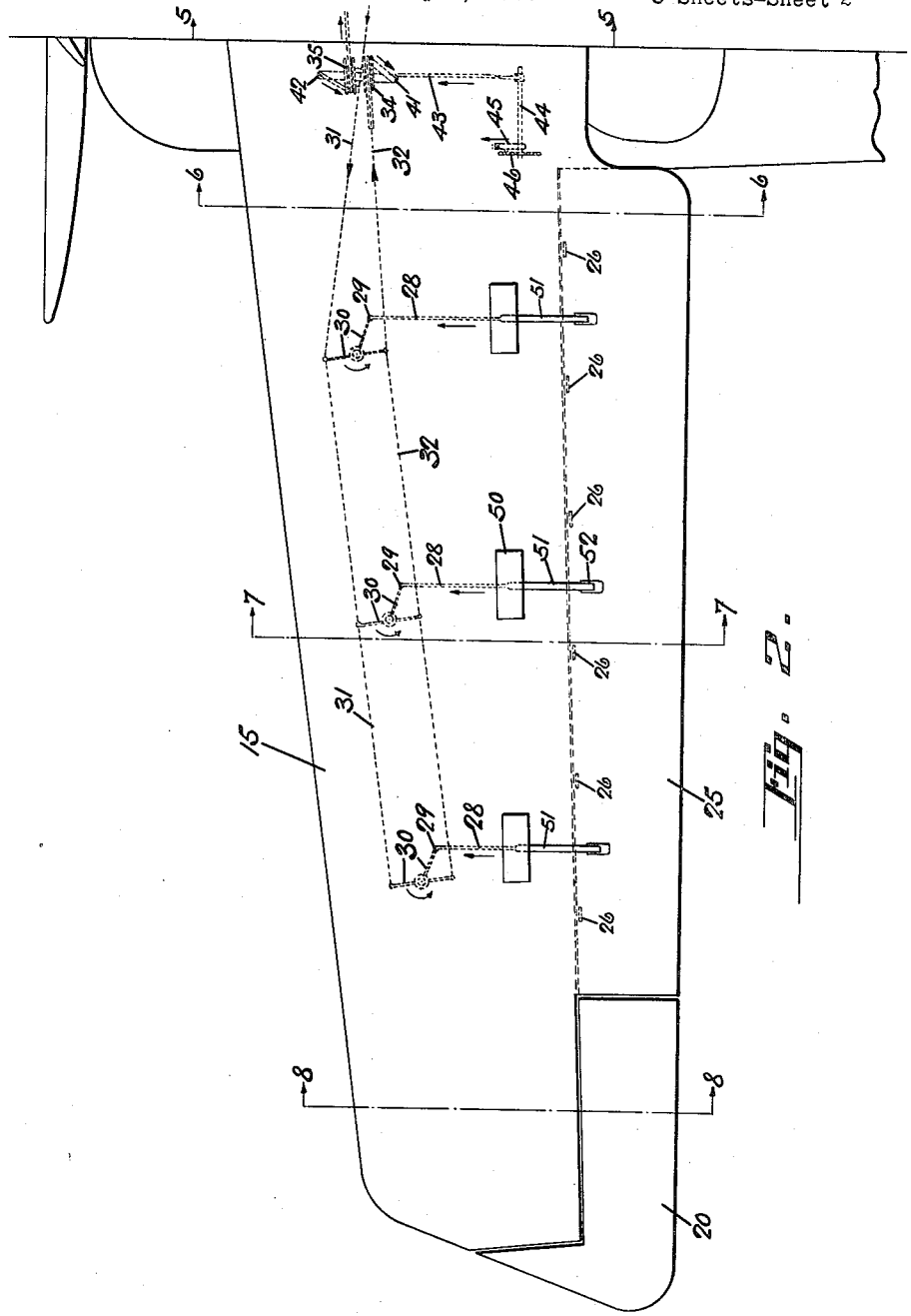
Fig. 2 is a top view of the left side of the plane and shows diagrammatically a means for operating a flap, on the trailing edge of the wing, for increasing the lift.

Figs. 5, 6, 7 and 8 show on an enlarged scale the sections through the wing on lines 5—5; 6—6; 7—7; and 8—8 respectively in Figs. 1 and 2.

Throughout the several views similar reference characters refer to similar parts.

Numeral 10 designates the main body or fuselage of the plane, 11 the wheels of the landing chassis, 12 the engine, and 13 the propeller.

Figure 5:
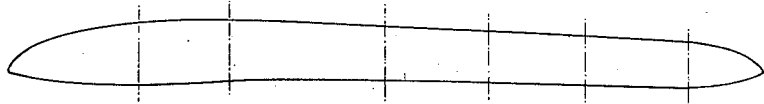
Figure 6:
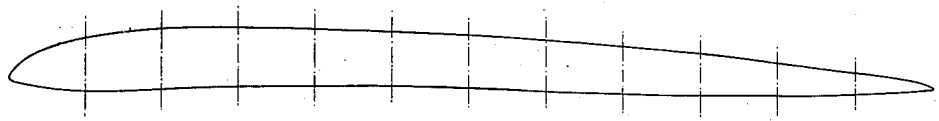
Figure 7:
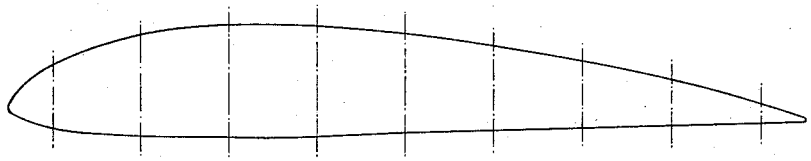
Figure 8:
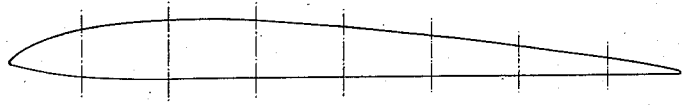

15 represents the single panel monoplane wing of the airplane which is semi-internally braced and is secured to the fuselage 10 by the short center struts 16 and the long main struts 17 which extend from the lower part of the fuselage 10 and out to the wing 15 at the fittings 18 which are some distance from the fuselage. These struts 17 are in tension during flight of the plane, and in compression taking the shock of the weight of the wings upon landing. It will be obvious that the outer ends of the wings 15 act as cantilevers from the point of support 18, both during flight and upon the shock of landing. Hence the bending moment in the wing 15 is at a peak or "maximum" at the point 18 or closely adjacent thereto, and gradually tapers off in both directions from this point. The distance between the point 18 and the point of attachment 19 of the center struts 16 is so determined that the bending moment in wing 15 is reduced to a very low value where the wing passes over the fuselage. By this means the wing 15 can be made of thin section, as illustrated in Figs. 5 and 6, at points adjacent the fuselage and yet be sufficiently strong to resist the bending stresses to which it is subjected. The thickness of the wing section gradually increases as the bending moment increases from the point 19 to the point 18, at which or closely adjacent to which it reaches a peak or "maximum" (see Fig. 7) corresponding to the peak in the bending moment curve. From the point 19 to the wing tip the wing thickness again tapers down to a section which has a higher aerodynamic efficiency. Instead of the entire wing 15 being built in a single panel, as shown in the drawings, it may be built with a center section, and right and left wing panels pinned thereto adjacent the point 19; or it may be built omitting the center section, the right and left wing panels being pinned together at a central support.

Among the advantages of this invention are: the greater aerodynamic efficiency of the permissible thin section over the thicker section; the proportioning of the strength and hence the weight to the stresses to be carried and hence obtaining a substantial reduction in the weight of the wing; the better flow of air stream obtainable on the tail planes due to the thin section at the fuselage, which is in marked contrast to the very thick sections of entirely internally braced wings; and the better vision for the occupants of the fuselage.

Of course this invention may be applied to other than monoplanes, such as to the ordinary biplane having interplane struts, the thickness of the wings at any point along their length being made roughly proportional to the bending stresses carried by the wing at that point.

In the drawings, I have shown the wing tapered in plan view which may have distinct advantages in a monoplane but of course is not essential to the use of this invention.

Figure 3:
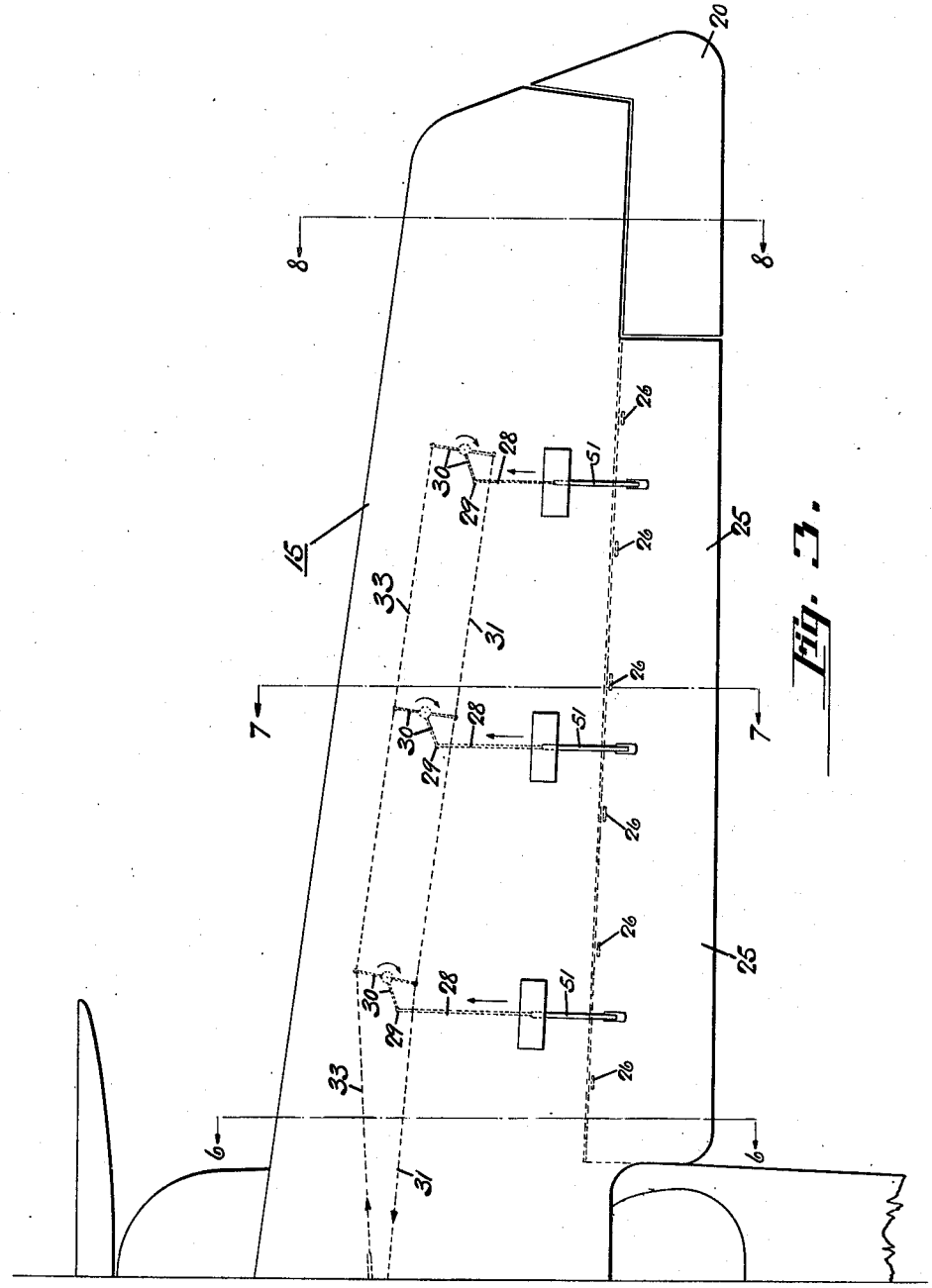
Fig. 3 is a view similar to Fig. 2 but shows the right side of the plane.
Figure 4:
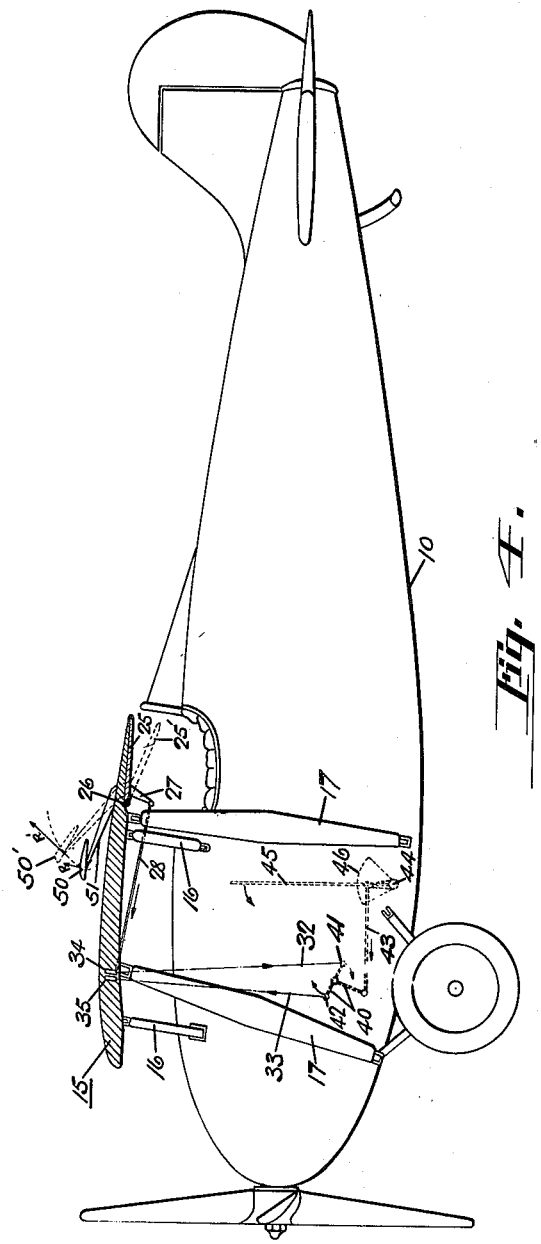
Fig. 4 is a diagrammatic view of a side elevation of the plane.

In Figs. 2, 3 and 4, I have shown the wings provided with flaps 25 on the lower surface of the trailing edge. These flaps 25 are operated on both right and left wings together for increasing the lift of the wings at such times as may be desired by the pilot. Reference is made to a copending application, Serial No. 474,046, filed May 31, 1921 which has been assigned to the assignees of this application, for a more complete description of the theory of operation of these flaps. The ailerons 20 occupy the trailing edge of the outer ends of the wings and the flaps 25 terminate at the ailerons, as shown in Figs. 2 and 3.

The flaps 25 are hinged to the wings 15 at the hinges 26 (see Fig. 4) and are provided with a plurality of masts 27 to which the actuating rods 28 are connected. The rods 28 are pivoted at 29 to the three-armed levers 30 (see Figs. 2 and 3) which are rotatably mounted within the wings 15, substantially as shown, the lower surface of the wings being provided with small slots for the passage therethrough of the rods 28. One set of arms of all the three-armed levers 30 on the left wing are connected together by the cable 32 which passes over the guide sheave 34 located in the wing at some point over the fuselage, and thence downward into the fuselage and is connected at 41 to the three-armed lever 40 which is rotatably mounted in the fuselage. Also one set of arms of all the three-armed levers 30 on the right wing are connected together by the cable 33 which passes over the guide sheave 35 pivoted adjacent to sheave 34 and thence downward into the fuselage and is connected at 42 to the three-armed lever 40. This lever 40 may be actuated by any suitable means. In the drawings I have shown the lever 40 linked by means of rod 43 and torque tube 44 to the long handle lever 45 which is positioned in some convenient position to be operated by the pilot. Of course if desired the lever 40 could be so positioned as to be directly connected to the long handle lever 45. The other arms of the three-armed levers 30 on both the left and right wings are all connected together by the cable 31 so that all the levers 30 are actuated in unison, the levers and cables being so arranged that the flaps 25 move up or down together, as clearly shown in the drawings. When the operator moves the handle 45 in the direction of the arrow, the lever 40 is rotated in the direction shown by the arrows, which will pull the cable 32 downward as shown. This cable 32 will act on all the levers 30 on the left wing to move the rods 28 in the directions shown to pull the left flap 25 downward. The cable 31 will also cause the levers 30 on the right wing to rotate in the directions shown and thus pull the right flap 25 downward with the left flap. Of course for the reverse movement of handle 45 tension is put upon cable 33 to cause a reverse movement of flaps 25. The handle lever 45 is provided with a locking quadrant 46 and quickly releasable locking means for locking the lever 45 in any position desired.

In order to balance the wind pressure against the flaps 25 to enable them to be operated easily in flight the flaps 25 have rigidly attached thereto a plurality of small air vanes 50 distributed along the length of the flaps and which project above the wings 15 as clearly shown in Fig. 4. These vanes 50 are preferably attached to the flaps 25 by means of a rigid arm 51 which moves in a slot 52 provided therefor through the wing 15. When the flap 25 is pulled down to the dotted position 25' the air vane 50 moves through a corresponding angle to the dotted position 50' and thus increases the angle of attack of the air vane to give an increased balancing effect to correspond to the increased pressure on the flap 25. When the flap 25 is in its up or closed position shown in Fig. 4, the vane 50 is preferably substantially stream-lined in the air stream so that it will not materially reduce the efficiency of the wings 15. The length of the arm 51 is so determined that the leverage of the resultant air pressure on the vane 50 is great enough to properly balance the air pressure on flap 25. Of course the arm 51 could be extended more nearly vertical and thus made shorter than as shown in Fig. 4, however in that case the resultant air pressure on the vane 50 would not have as great a turning effect on flap 25 as in the arrangement illustrated and the drift would be greater in proportion to the lift on the vane 50. It will be seen that the resultant air pressure R on vane 50 is almost vertical when flap 25 is up, and when the flap is down the resultant R' is at all times substantially normal to its lever arm. The vanes 50 may be of aerofoil section, or flat plates, and preferably have an aspect ratio of about three but of course any shaped vanes may be used. The size and number of air vanes 50 may be made great enough to completely balance the flaps 25 if desired, but preferably they are made great enough to only reduce the force necessary to operate the flaps 25 so that they may be quickly and readily operated by the pilot.

Of course the use of the multi-tapered wing does not depend upon the use of the flaps on the trailing edge, as the said wing may be used with or without the flaps 25, however this wing is peculiarly adaptable to the use of the auxiliary air vanes. These vanes are preferably located at the thinner sections of the wing and serve to increase the aerodynamic efficiency of the thin sections at high angles of incidence.

While the forms of mechanisms herein shown and described, constitute preferred forms of embodiment of the present invention, it is to be understood that other forms might be adopted, all coming within the scope of the claims which follow.

What I claim is as follows:

1. In an airplane, a wing having a rigid upper surface and a movable lower flap, said flap being operable to increase the lift of the wing, means for actuating the flap, an auxiliary air vane interconnected with said flap, and means for utilizing the air pressure on said vane to balance the force necessary to actuate the flap during flight.

2. In an airplane, a wing having a rigid upper surface and a hinged lower flap, said flap being operable to increase the lift of the wing, means for actuating the flap, an auxiliary air vane rigidly secured to said flap, and means for utilizing the air pressure on said vane to aid in the actuation of the flap during flight.

3. In an airplane, a wing having a rigid upper surface and a movable lower flap, said flap being operable to increase the lift of the wing, means for actuating the flap, an auxiliary air vane rigidly secured to said flap and positioned so that the air pressure against said vane has a balancing effect on the air pressure against the flap.

4. In an airplane, an aerofoil having a trailing portion relatively stationary to the main portion of said aerofoil, a movable trailing portion below but adjacent said stationary trailing portion and operable to increase the aerodynamic force on said aerofoil, an auxiliary vane interconnected with said movable portion in such manner that the air pressure against the vane has a balancing effect on the air pressure against the movable trailing portion.

5. In an airplane, an aerofoil having a trailing portion relatively stationary to the main portion of said aerofoil, a movable trailing portion below but adjacent said stationary trailing portion and operable to increase the aerodynamic force on said aerofoil, an auxiliary vane interconnected with said movable portion and positioned on the opposite side of the stationary trailing portion, said interconnections being such that said vane moves with and balances the movement of the movable trailing portion.

6. In an airplane, an aerofoil having a trailing portion relatively stationary to the main portion of said aerofoil, a movable flap hinged below said stationary trailing portion and operable to increase the total air pressure upon said aerofoil, an auxiliary air vane rigidly connected to said flap in such relative position that the air pressure against the vane has a balancing effect on the air pressure against the flap.

7. In an airplane, an aerofoil having a trailing portion relatively stationary to the main portion of said aerofoil, a movable flap hinged below said stationary trailing portion and operable to increase the total air pressure upon said aerofoil, an auxiliary air vane interconnected with said flap and automatically operable to balance the air pressure against said flap.

8. In an airplane, an aerofoil having a trailing portion relatively stationary to the main portion of said aerofoil, a movable flap hinged below said stationary trailing portion and operable to increase the total air pressure upon said aerofoil, an auxiliary air vane located at the opposite side of said stationary trailing portion and rigidly connected to said flap through arms extending through said trailing portion whereby said flaps are balanced by said vanes.

In testimony whereof I hereto affix my signature.

VIRGINIUS E. CLARK.

Witnesses:
WALTER W. RIEDEL,
WM. P. PASCO.